United States Patent
Takazane

(10) Patent No.: US 9,350,134 B2
(45) Date of Patent: May 24, 2016

(54) LASER OSCILLATOR PROVIDED WITH LASER MEDIUM FLOW PATH

(71) Applicant: FANUC CORPORATION, Minamitsuru-gun, Yamanashi (JP)

(72) Inventor: Tetsuhisa Takazane, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/833,479

(22) Filed: Aug. 24, 2015

(65) Prior Publication Data
US 2016/0056602 A1  Feb. 25, 2016

(30) Foreign Application Priority Data

Aug. 25, 2014 (JP) .................................. 2014-170702

(51) Int. Cl.
| | |
|---|---|
| *H01S 3/03* | (2006.01) |
| *H01S 3/032* | (2006.01) |
| *H01S 3/036* | (2006.01) |
| *H01S 3/223* | (2006.01) |
| *H01S 3/041* | (2006.01) |

(52) U.S. Cl.
CPC .................. *H01S 3/032* (2013.01); *H01S 3/036* (2013.01); *H01S 3/041* (2013.01); *H01S 3/2232* (2013.01)

(58) Field of Classification Search
CPC ........... H01S 3/03; H01S 3/032; H01S 3/036; H01S 3/2232; H01S 3/073; H01S 3/076
See application file for complete search history.

(56) References Cited

FOREIGN PATENT DOCUMENTS

| | | |
|---|---|---|
| JP | 58182288 | 10/1983 |
| JP | 63110683 | 5/1988 |
| JP | 63-239888 A | 10/1988 |
| JP | 64028878 | 1/1989 |
| JP | 01204486 | 8/1989 |
| JP | 04044283 | 2/1992 |
| JP | 2010-171145 A | 8/2010 |

*Primary Examiner* — Armando Rodriguez
(74) *Attorney, Agent, or Firm* — RatnerPrestia

(57) ABSTRACT

A laser oscillator which can keep distributions of pressure of a laser medium inside of a plurality of discharge tubes constant while making the laser medium circulate without stagnating. The laser oscillator is comprised of a first discharge tube, second discharge tube, first light guide, laser medium flow path, and blower. A flow resistance of a laser medium flow path between the blower and the first discharge tube and a flow resistance of the laser medium flow path between the blower and second discharge tube are the same as each other. A flow resistance of the laser medium flow path between the blower and a first end of the first light guide and a flow resistance of the laser medium flow path between the blower and a second end of the first light guide differ from each other.

11 Claims, 12 Drawing Sheets

LASER OSCILLATOR PROVIDED WITH LASER MEDIUM FLOW PATH

BACKGROUND ART

1. Field of the Invention

The invention relates to a laser oscillator which is provided with a laser medium flow path for circulating a laser medium.

2. Description of the Related Art

Known in the art is a laser oscillator which is provided with folding mirrors which are arranged on a path of laser light between two discharge tubes wherein the flow of laser medium is prevented from ending up stagnating near the folding mirrors (for example, see Japanese Patent Publication No. 63-239888A and Japanese Patent Publication No. 2010-171145A).

In a laser oscillator including a plurality of discharge tubes, if the distributions of pressure of the laser medium in the discharge tubes differ from each other, the laser power of the generated laser light may become unstable. Therefore, a technique is desired which can circulate the laser medium without stagnation while making the pressures of the laser medium in a plurality of discharge tubes constant.

SUMMARY OF THE INVENTION

The laser oscillator according to the invention comprises a first discharge tube and a second discharge tube; a first light guide which is arranged between a first end of the first discharge tube and a first end of the second discharge tube; a laser medium flow path which is in fluid communication with the first discharge tube, second discharge tube, and first light guide; and a blower which is arranged in the laser medium flow path so as to circulate the laser medium to the laser medium flow path, first discharge tube, and second discharge tube.

A flow resistance of the laser medium flow path between a discharge opening of the blower and the first end of the first discharge tube is equal to a flow resistance of the laser medium flow path between the discharge opening and the first end of the second discharge tube. A flow resistance of the laser medium flow path between an intake opening of the blower and a second end of the first discharge tube opposite the first end is equal to a flow resistance of the laser medium flow path between the intake opening and a second end of the second discharge tube opposite the first end.

A flow resistance of the laser medium flow path between the discharge opening and a first end of the first light guide is different from a flow resistance of the laser medium flow path between the discharge opening and a second end of the first light guide opposite the first end.

The length of the laser medium flow path between the discharge opening and the first end of the first light guide may be shorter than the length of the laser medium flow path between the discharge opening and the second end of the first light guide. The laser medium flow path between the discharge opening and the first end of the first light guide may include a portion which has a first equivalent diameter, while the laser medium flow path between the discharge opening and the second end of the first light guide may have a portion which has a second equivalent diameter smaller than the first equivalent diameter.

The laser oscillator may further comprise a heat exchanger which is arranged at least one of downstream side of the discharge opening and upstream side of the intake opening in order to remove heat from the passing laser medium. The laser oscillator may further comprise a first flow adjustment part which adjusts a flow rate of the laser medium which flows through the inside of the first light guide.

A ratio of the flow rate of the laser medium which flows through the insides of the first discharge tube and second discharge tube to the flow rate of the laser medium which flows through the inside of the first light guide may be larger than 10 and smaller than 15.

The laser oscillator may further comprise a third discharge tube which has a first end and a second end opposite the first end; and a second light guide which is arranged between the second end of the second discharge tube and the second end of the third discharge tube. In this case, the laser medium flow path may be in fluid communication with each of the second light guide and the third discharge tube.

A flow resistance of the laser medium flow path between the discharge opening and the first end of the third discharge tube may be equal to a flow resistance of the laser medium flow path between the discharge opening and the first end of the first discharge tube. A flow resistance of the laser medium flow path between the intake opening and the second end of the third discharge tube may be equal to a flow resistance of the laser medium flow path between the intake opening and the second end of the first discharge tube.

A flow resistance of the laser medium flow path between the intake opening and a first end of the second light guide may be different from a flow resistance of the laser medium flow path between the intake opening and a second end of the second light guide opposite the first end.

The length of the laser medium flow path between the intake opening and the first end of the second light guide may be longer than the length of the laser medium flow path between the intake opening and the second end of the second light guide. The laser medium flow path between the intake opening and the first end of the second light guide may include a portion which has a third equivalent diameter, while the laser medium flow path between the intake opening and the second end of the second light guide may include a portion which has a fourth equivalent diameter larger than the third equivalent diameter.

The ratio of the flow rate of the laser medium which flows through the insides of the first discharge tube, second discharge tube, and third discharge tube to the flow rate of the laser medium which flows through the insides of the first light guide and the second light guide may be larger than 10 and smaller than 15. The laser oscillator may further comprise a second flow adjustment part which adjusts the flow rate of the laser medium which flows through the inside of the second light guide.

BRIEF DESCRIPTION OF THE DRAWINGS

These and other objects, features, and advantages of the invention will become clearer with reference to the detailed description of illustrative embodiments of the invention which are shown in the attached drawings, wherein.

DETAILED DESCRIPTION

Figure 1:
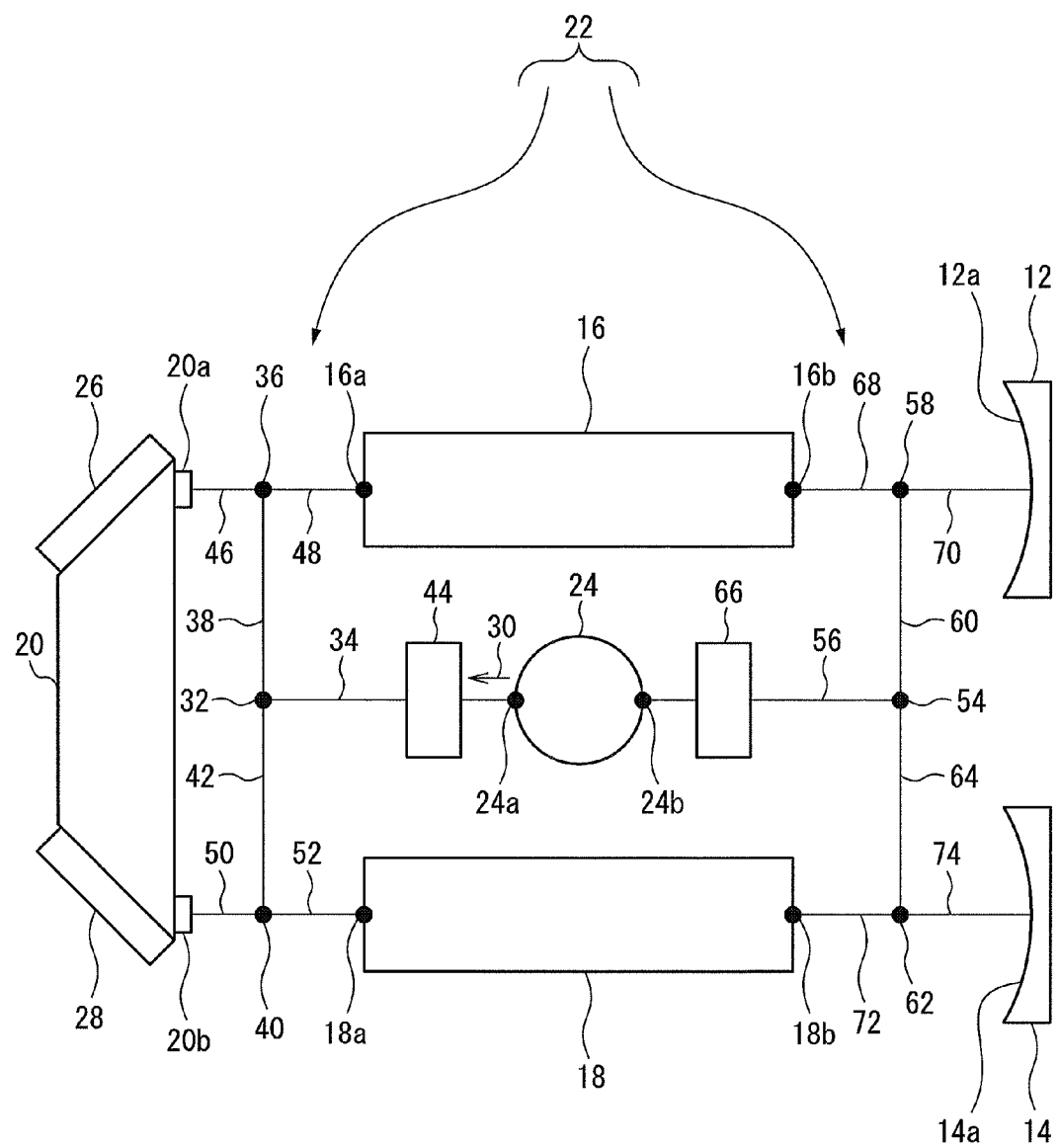
FIG. 1 is a schematic view of a laser oscillator according to an embodiment.

Below, embodiments of the invention will be explained in detail based on the drawings. First, referring to FIG. 1, a laser oscillator 10 according to an embodiment of the invention will be explained. Note that, in the various embodiments explained below, similar elements will be assigned the same reference numeral, and detailed explanations thereof will be omitted.

The laser oscillator 10 includes an output mirror 12, a rear mirror 14, a first discharge tube 16, a second discharge tube 18, a light guide (first light guide) 20, a laser medium flow path 22, and a blower 24. The output mirror 12 and the rear mirror 14 are optically coupled with each other via the light guide 20.

The output mirror 12 is comprised of a partially reflective mirror (so-called "half mirror"), and has a concave surface 12a at the side where laser light propagating from the rear mirror 14 is received. The output mirror 12 passes part of the laser light incident on the concave surface 12a, and emits it to the outside.

The rear mirror 14 is comprised of a total reflection mirror, and has a concave surface 14a at the side where laser light propagating from the output mirror 12 is received. The rear mirror 14 reflects substantially entire laser light incident on the concave surface 14a.

The first discharge tube 16 is a hollow member having a first end 16a and a second end 16b opposite the first end 16a. The first discharge tube 16 is arranged so that the second end 16b thereof faces the output mirror 12. The first discharge tube 16 has an inner peripheral surface comprised of quartz etc. and an outer peripheral surface on which a discharge electrode (not shown) is mounted. The discharge electrode is electrically connected to a discharge power supply (not shown).

The second discharge tube 18 is configured the same as the first discharge tube 16. Specifically, the second discharge tube 18 is a hollow member having a first end 18a and a second end 18b opposite the first end 18a.

The second discharge tube 18 is arranged so that the second end 18b thereof faces the rear mirror 14. The second discharge tube 18 has an inner peripheral surface comprised of quartz etc. and an outer peripheral surface on which a discharge electrode (not shown) is mounted. The discharge electrode is electrically connected to the discharge power supply.

The light guide 20 is arranged between the first end 16a of the first discharge tube 16 and the first end 18a of the second discharge tube 18. The light guide 20 is a hollow member having a first end 20a and a second end 20b opposite the first end 20a. The light guide 20 guides laser light propagating from the output mirror 12 toward the rear mirror 14, and guides laser light propagating from the rear mirror 14 toward the output mirror 12.

Specifically, the light guide 20 is provided with a first folding mirror 26 and a second folding mirror 28. The first folding mirror 26 is comprised of a total reflection mirror, and arranged on the light path of laser light propagating from the output mirror 12 so as to be inclined relative to the light path by 45° in angle.

The first folding mirror 26 reflects laser light propagating from the output mirror 12 toward the second folding mirror 28, while reflects laser light propagating from the second folding mirror 28 toward the output mirror 12.

The second folding mirror 28 is comprised of a total reflection mirror, and arranged on the light path of the laser light propagating from the first folding mirror 26 so as to be inclined relative to the light path by 45° in angle.

The second folding mirror 28 reflects laser light propagating from the first folding mirror 26 toward the rear mirror 14, while reflects laser light propagating from the rear mirror 14 toward the first folding mirror 26.

The laser medium flow path 22 is a tubular member which is in fluid communication with the insides of the first discharge tube 16, second discharge tube 18, and light guide 20. The laser medium flow path 22 functions to circulate a laser medium including $CO_2$ gas etc. to the insides of the first discharge tube 16, second discharge tube 18, and light guide 20.

The blower 24 is arranged in the laser medium flow path 22. The blower 24 is e.g. an axial-flow type blower which generates pressure fluctuations in the laser medium inside the laser medium flow path 22 so as to flow the laser medium in the direction indicated by the arrow 30 in FIG. 1.

Below, the configuration of the laser medium flow path 22 according to the present embodiment will be explained in more detail. The laser medium flow path 22 includes a flow path 34 extending between a discharge opening 24a of the blower 24 and a branch part 32; a flow path 38 extending between the branch part 32 and a branch part 36; and a flow path 42 extending between the branch part 32 and a branch part 40.

Each of the branch parts 32, 36, and 40 is comprised of e.g. a three-way joint pipe. The branch part 32 is arranged at downstream side of the discharge opening 24a of the blower 24. A heat exchanger 44 is provided at the flow path 34. The heat exchanger 44 removes heat from the laser medium passing therethrough.

The branch part 36 is arranged at downstream side of the branch part 32 between the first discharge tube 16 and the light guide 20. On the other hand, the branch part 40 is arranged at downstream side of the branch part 32 between the second discharge tube 18 and the light guide 20.

The laser medium flow path 22 further includes a flow path 46 extending between the branch part 36 and the first end 20a of the light guide 20; a flow path 48 extending between the branch part 36 and the first end 16a of the first discharge tube 16; a flow path 50 extending between the branch part 40 and the second end 20b of the light guide 20; and a flow path 52 extending between the branch part 40 and the first end 18a of the second discharge tube 18.

The flow path 46 is in fluid communication with the inside of the light guide 20 through the first end 20a of the light guide 20, while the flow path 48 is in fluid communication with the inside of the first discharge tube 16 through the first end 16a of the first discharge tube 16a. Similarly, the flow path 50 is in fluid communication with the inside of the light guide 20 through the second end 20b of the light guide 20, while the flow path 52 is in fluid communication with the inside of the second discharge tube 18 through the first end 18a of the second discharge tube 18.

The laser medium flow path 22 further includes a flow path 56 extending between an intake opening 24b of the blower 24 and a branch part 54; a flow path 60 extending between the branch part 54 and a branch part 58; and a flow path 64 extending between the branch part 54 and a branch part 62.

Each of the branch parts 54, 58, and 62 is comprised of a three-way joint pipe, similar to the above-mentioned branch parts 32, 36, and 40. The branch part 54 is arranged at upstream side of the intake opening 24b of the blower 24. A heat exchanger 66 is provided at the flow path 56. The heat exchanger 66 removes heat from the passing laser medium, similar to the above-mentioned heat exchanger 44.

The branch part 58 is arranged at upstream side of the branch part 54 between the first discharge tube 16 and the output mirror 12. On the other hand, the branch part 62 is arranged at upstream side of the branch part 54 between the second discharge tube 18 and the rear mirror 14.

The laser medium flow path 22 further includes a flow path 68 extending between the branch part 58 and the second end 16b of the first discharge tube 16; a flow path 70 extending between the branch part 58 and the output mirror 12; a flow path 72 extending between the branch part 62 and the second end 18b of the second discharge tube 18; and a flow path 74 extending between the branch part 62 and the rear mirror 14.

The flow path 68 is in fluid communication with the inside of the first discharge tube 16 through the second end 16b of the first discharge tube 16. Further, the flow path 72 is in fluid communication with the inside of the second discharge tube 18 through the second end 18b of the second discharge tube 18.

Next, referring to FIG. 1, the functions of the laser oscillator 10 will be explained. When generating laser light, the discharge electrodes of the first discharge tube 16 and the second discharge tube 18 are supplied with power from the discharge power supply (not shown), whereby discharges are occurred insides of the first discharge tube 16 and the second discharge tube 18.

Due to the discharges, the laser medium supplied to the insides of the first discharge tube 16 and the second discharge tube 18 is excited, whereby laser light is generated. Laser light generated in the first discharge tube 16 and second discharge tube 18 is amplified by optical resonance between the output mirror 12, light guide 20, and rear mirror 14, and emitted from the output mirror 12 to the outside.

As the laser power of generated laser light becomes greater, the laser medium is heated up by laser light, whereby the temperature of the laser medium becomes higher. If the temperature of the laser medium becomes higher, laser light tends to be easily absorbed in the laser medium, as a result of which the laser power may become unstable.

Therefore, in order to stably supply the laser medium into the first discharge tube 16 and the second discharge tube 18 and to prevent the temperature of the laser medium from becoming excessively high, the blower 24 and laser medium flow path 22 circulate the laser medium through the insides of the first discharge tube 16, second discharge tube 18, and light guide 20.

Figure 2:
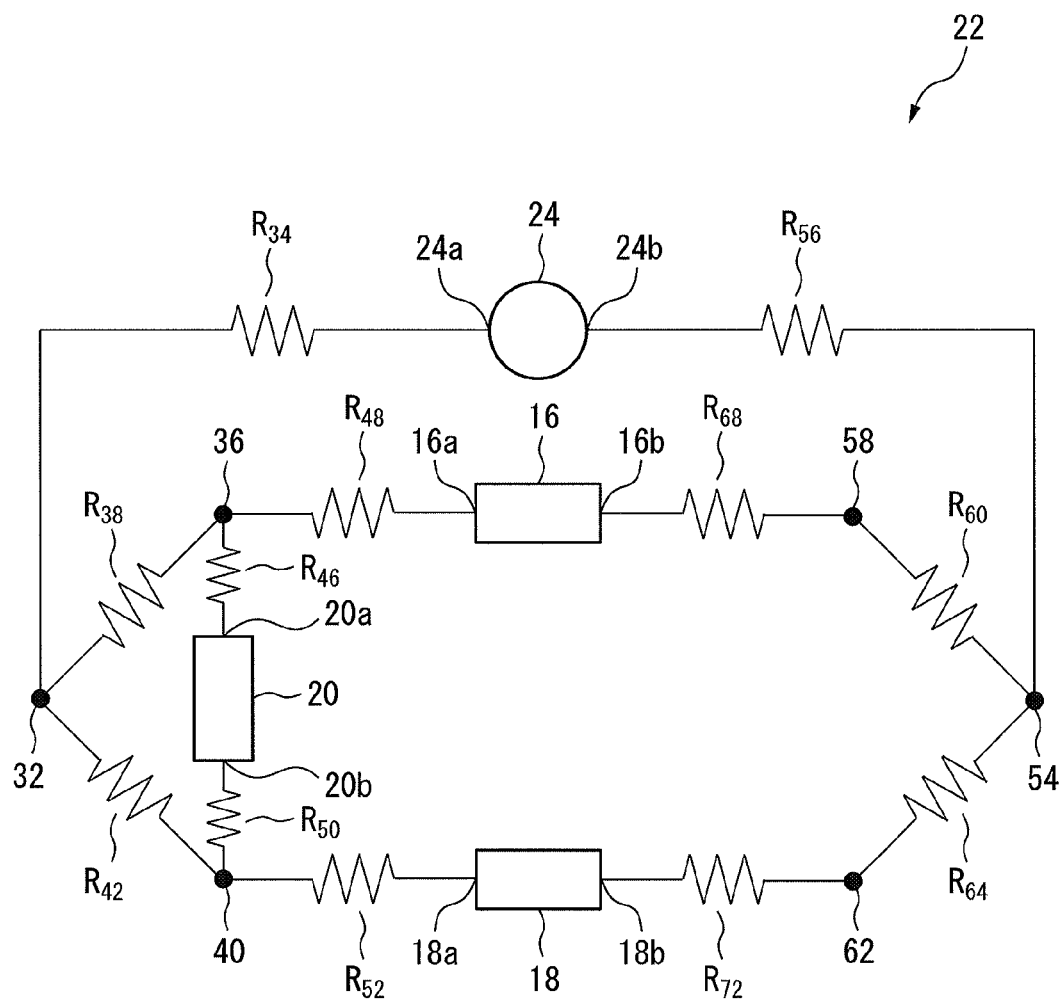
FIG. 2 shows an equivalent circuit of the laser medium flow path shown in FIG. 1.

Next, referring to FIG. 1 and FIG. 2, the flow resistance of the laser medium flow path 22 will be explained. FIG. 2 is a view of an equivalent circuit showing the flow resistances of the respective flow paths which constitute the laser medium flow path 22. Here, the flow resistance "$R_{XX}$" shown in FIG. 2 corresponds to the flow resistance of the flow path "XX" in FIG. 1. For example, the flow resistance of the flow path 34 in FIG. 1 is shown as the flow resistance $R_{34}$ in FIG. 2.

The discharge opening 24a of the blower 24 and the first end 20a of the light guide 20 are fluidly connected to each other via the flow paths 34, 38, and 46. Therefore, the flow resistance $R_A$ of the laser medium flow path 22 between the discharge opening 24a of the blower 24 and the first end 20a of the light guide 20 depends on the flow resistance $R_{34}$ of the flow path 34, the flow resistance $R_{38}$ of the flow path 38, and the flow resistance $R_{46}$ of the flow path 46.

On the other hand, the discharge opening 24a of the blower 24 and the second end 20b of the light guide 20 are fluidly connected to each other via the flow paths 34, 42, and 50. Therefore, the flow resistance $R_B$ of the laser medium flow path 22 between the discharge opening 24a of the blower 24 and the second end 20b of the light guide 20 depends on the flow resistance $R_{34}$ of the flow path 34, the flow resistance $R_{42}$ of the flow path 42, and the flow resistance $R_{50}$ of the flow path 50.

According to the present embodiment, in order to generate a flow of laser medium in the light guide 20, the laser medium flow path 22 is configured so that the flow resistance $R_A$ is different from the flow resistance $R_B$. Specifically, the flow paths 46, 50, 38, and 42 are configured so that the flow resistance $R_{46}$ is equal to the flow resistance $R_{50}$, while the flow resistance $R_{38}$ is smaller than the flow resistance $R_{42}$.

According to this configuration, since the laser medium pressure at the first end 20a of the light guide 20 becomes higher than the laser medium pressure at the second end 20b of the light guide 20, it is possible to generate a flow of the laser medium inside of the light guide 20 from the first end 20a toward the second end 20b.

In general, a flow resistance of a flow path is proportional to the length of the flow path and to the frictional resistance of the inner peripheral surface of the flow path, while is inversely proportional to the cross-sectional area (equivalent diameter) of the flow path. Therefore, it is possible to make the flow resistance $R_{38}$ differ from the flow resistance $R_{42}$ by adjusting the lengths of the flow paths 38 and 42, the surface roughnesses of the inner peripheral surfaces of the flow paths 38 and 42, or the equivalent diameters of the flow paths 38 and 42.

Figure 3:
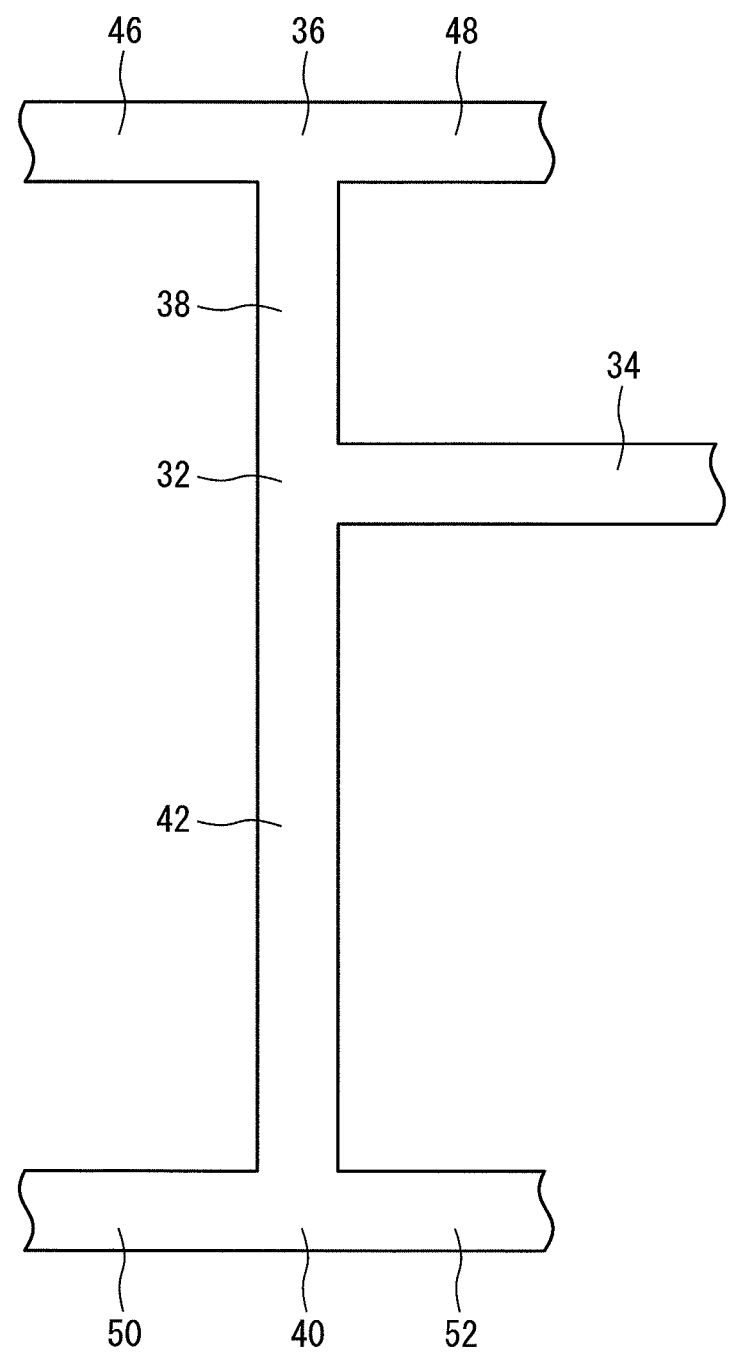
FIG. 3 shows an example of the laser medium flow path shown in FIG. 1.

As an example, FIG. 3 shows an embodiment in which the length of the flow path 38 is set to be shorter than the length of the flow path 42. According to this configuration, the flow resistance $R_{38}$ becomes smaller than the flow resistance $R_{42}$, so the flow resistance $R_A$ can be made smaller than the flow resistance $R_B$.

Figure 4:
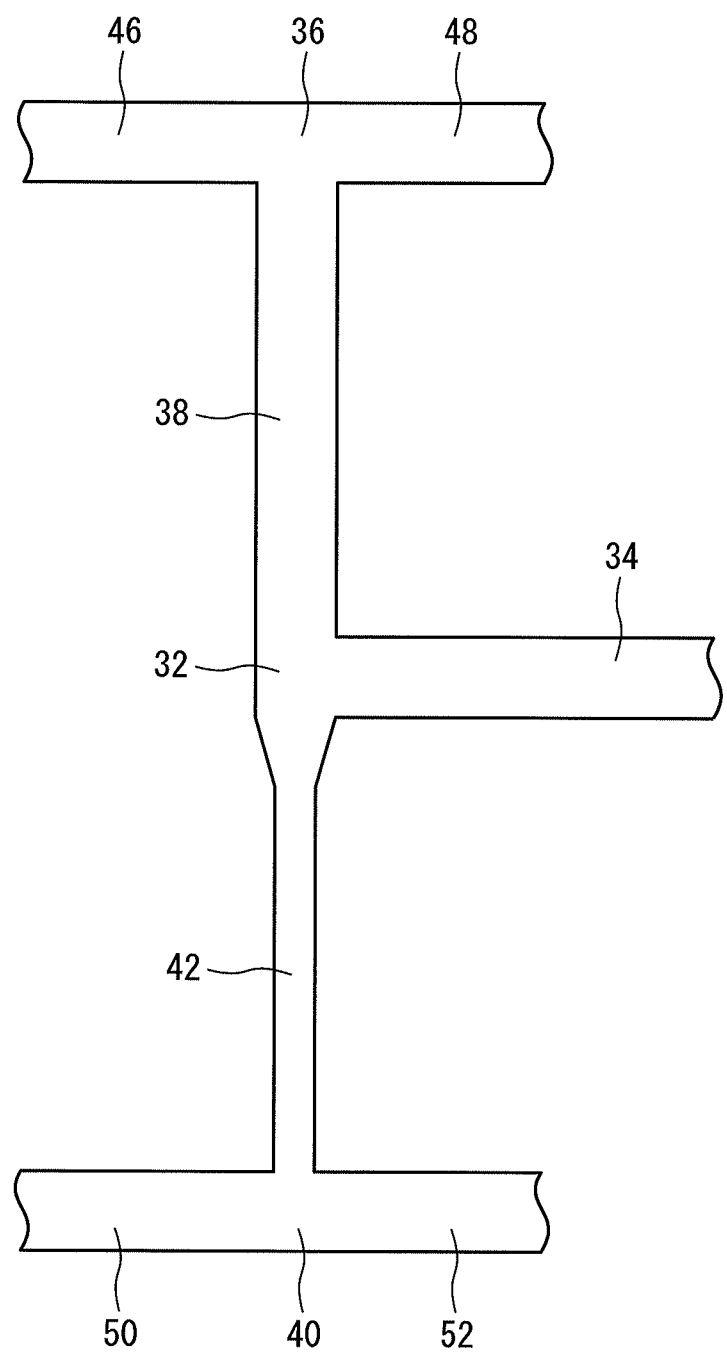
FIG. 4 shows another example of the laser medium flow path shown in FIG. 1.

Further, as another example, FIG. 4 shows an embodiment in which the equivalent diameter of the flow path 38 is set to be larger than the equivalent diameter of the flow path 42. According to this configuration, the flow resistance $R_{38}$ becomes smaller than the flow resistance $R_{42}$, so the flow resistance $R_A$ can be made smaller than the flow resistance $R_B$.

Figure 5:
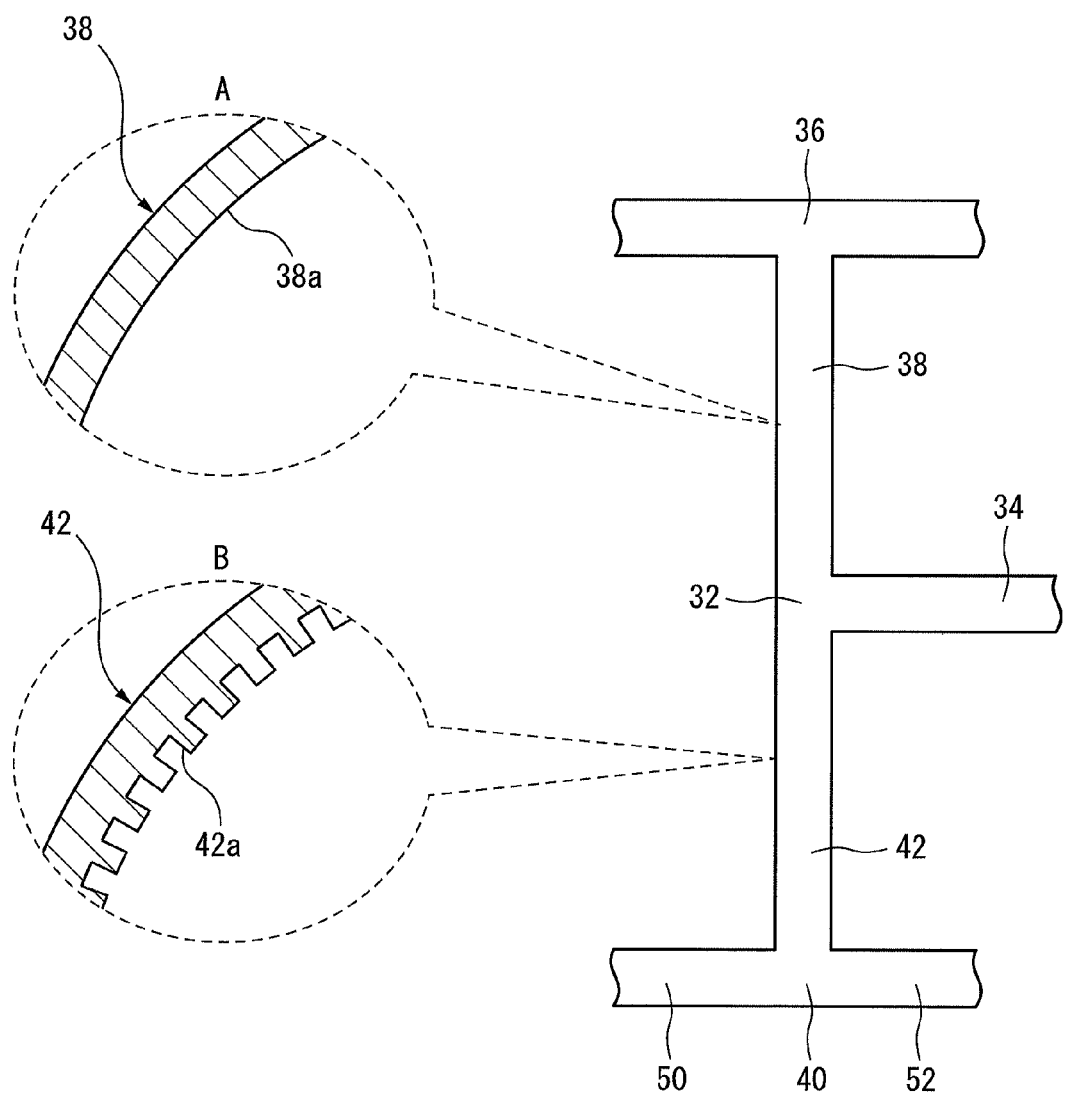
FIG. 5 shows still another example of the laser medium flow path shown in FIG. 1.

Further, as still another example, FIG. 5 shows an embodiment in which the flow path 38 has a surface roughness different from that of the flow path 42. The region A in FIG. 5 shows an enlarged cross-sectional view of the flow path 38, and the region B in FIG. 5 shows an enlarged cross-sectional view of the flow path 42.

In this embodiment, the flow path 38 has a smooth inner peripheral surface 38a as shown in the region A of FIG. 5. On the other hand, the flow path 42 has an inner peripheral surface 42a on which concave-convex shapes are formed, as shown in the region B of FIG. 5. According to this configuration, the flow resistance $R_{38}$ becomes smaller than the flow resistance $R_{42}$, so the flow resistance $R_A$ can be made smaller than the flow resistance $R_B$.

Referring again to FIG. 1 and FIG. 2, the discharge opening 24a of the blower 24 and the first end 16a of the first discharge tube 16 are fluidly connected to each other via the flow paths 34, 38, and 48. Therefore, the flow resistance $R_C$ of the laser medium flow path 22 between the discharge opening 24a of the blower 24 and the first end 16a of the first discharge tube 16 depends on the flow resistance $R_{34}$ of the flow path 34, the flow resistance $R_{38}$ of the flow path 38, and the flow resistance $R_{48}$ of the flow path 48.

On the other hand, the discharge opening 24a of the blower 24 and the first end 18a of the second discharge tube 18 are fluidly connected to each other via the flow paths 34, 42, and 52. Therefore, the flow resistance $R_D$ of the laser medium flow path 22 between the discharge opening 24a of the blower 24 and the first end 18a of the second discharge tube 18 depends on the flow resistance $R_{34}$ of the flow path 34, the flow resistance $R_{42}$ of the flow path 42, and the flow resistance $R_{52}$ of the flow path 52.

According to the present embodiment, the laser medium flow path 22 is configured so that the flow resistance $R_C$ is equal to the flow resistance $R_D$. As explained above, the flow resistance $R_{38}$ is set to be smaller than the flow resistance $R_{42}$. Therefore, in order to make the flow resistance $R_C$ and the flow resistance $R_D$ be the same as each other, the flow path 48 and flow path 52 are configured so that the flow resistance $R_{48}$ becomes larger than the flow resistance $R_{52}$.

For example, the flow path 48 and flow path 52 may be configured so that the length of the flow path 48 becomes longer than the length of the flow path 52. Alternatively, the flow path 48 and flow path 52 may be configured so that the equivalent diameter of the flow path 48 becomes smaller than the equivalent diameter of the flow path 52, or may be configured so that the surface roughness of the inner peripheral surface of the flow path 48 becomes rougher than that of the flow path 52.

On the other hand, the intake opening 24b of the blower 24 and the second end 16b of the first discharge tube 16 are fluidly connected to each other via the flow paths 56, 60, and 68. Therefore, the flow resistance $R_E$ of the laser medium flow path 22 between the intake opening 24b of the blower 24 and the second end 16b of the first discharge tube 16 depends on the flow resistance $R_{56}$ of the flow path 56, the flow resistance $R_{60}$ of the flow path 60, and the flow resistance $R_{68}$ of the flow path 68.

Further, the intake opening 24b of the blower 24 and the second end 18b of the second discharge tube 18 are fluidly connected to each other via the flow paths 56, 64, and 72. Therefore, the flow resistance $R_F$ of the laser medium flow path 22 between the intake opening 24b of the blower 24 and the second end 18b of the second discharge tube 18 depends on the flow resistance $R_{56}$ of the flow path 56, the flow resistance $R_{64}$ of the flow path 64, and the flow resistance $R_{72}$ of the flow path 72.

According to the present embodiment, the laser medium flow path 22 is configured so that the flow resistance $R_E$ is equal to the flow resistance $R_F$. For example, the flow paths 60 and 68 are respectively comprised of pipes the same as the flow paths 64 and 72. In this case, the flow resistance $R_E$ and the flow resistance $R_F$ can easily be made the same.

Thus, the laser medium flow path 22 according to the present embodiment is configured so that the flow resistance $R_C$ is equal to the flow resistance $R_D$, and the flow resistance $R_E$ is equal to the flow resistance $R_F$.

According to this configuration, the pressure of the laser medium at the first end 16a of the first discharge tube 16 and the pressure of the laser medium at the first end 18a of the second discharge tube 18 can be made the same as each other. In addition, the pressure of the laser medium at the second end 16b of the first discharge tube 16 and the pressure of the laser medium at the second end 18b of the second discharge tube 18 can be made the same as each other.

Due to this, it is possible to make the pressure distributions in the first discharge tube 16 and the second discharge tube 18 be the same, whereby uniform discharge can be occurred in the first discharge tube 16 and the second discharge tube 18. Therefore, it is possible to generate uniform laser light in the first discharge tube 16 and second discharge tube 18.

Next, the flow of the laser medium in the laser medium flow path 22 will be explained. The laser medium discharged from the blower 24 passes through the flow path 34 and the heat exchanger 44, and reaches the branch part 32. Further, the laser medium is divided into the flow path 38 and the flow path 42 at the branch part 32.

The laser medium flown into the flow path 38 passes through the flow path 38, and reaches the branch part 36. On the other hand, the laser medium flown into to the flow path 42 from the branch part 32 passes through the flow path 42, then reaches the branch part 40.

As explained above, in the present embodiment, a flow from the branch part 36 toward the light guide 20 is generated due to the difference between the flow resistance $R_A$ and the flow resistance $R_B$. Therefore, the laser medium having reached the branch part 36 is divided into the flow path 46 and the flow path 48 at the branch part 36. The laser medium flown into the flow path 46 flows into the light guide 20 through the first end 20a, and passes through the inside of the light guide 20.

The laser medium passing through the light guide 20 flows into the flow path 50 through the second end 20b, then passes through the flow path 50, and then reaches the branch part 40. On the other hand, the laser medium flown into the flow path 48 flows into the first discharge tube 16 through the first end 16a.

On the other hand, the laser medium flown into the flow path 42 from the branch part 32 passes through the flow path 42, then reaches the branch part 40, whereby merges with the laser medium having passed through the flow path 50. The merged laser medium passes through the flow path 52 and flows into the second discharge tube 18 through the first end 18a.

The laser medium passing through the first discharge tube 16 flows into the flow path 68 through the second end 16b, then passes through the flow path 68, and then reaches the branch part 58 so as to be divided into the flow path 60 and the flow path 70 at the branch part 58. The laser medium flown into the flow path 60 passes through the flow path 60 and reaches the branch part 54.

On the other hand, the laser medium passing through the second discharge tube 18 flows into the flow path 72 through the second end 18b, then passes through the flow path 72, and then reaches the branch part 62 so as to be divided into the flow path 64 and the flow path 74 at the branch part 62.

The laser medium flown into the flow path 64 passes through the flow path 64, then reaches the branch part 54, whereby merges with the laser medium having flowed through the flow path 60. The merged laser medium flows into the flow path 56, passes through the heat exchanger 66, and then reaches the intake opening 24b of the blower 24.

According to the present embodiment, by setting the flow resistances $R_A$, $R_B$, $R_C$, $R_D$, $R_E$, and $R_F$ so as to satisfy the above-mentioned relationships, it is possible to generate a flow of laser medium inside the light guide 20, while keeping the pressure distributions in the first discharge tube 16 and the second discharge tube 18 the same.

Due to this, it is possible to prevent stagnation of the laser medium inside of the light guide 20 and effectively remove heat of the laser medium, while making the discharges in the first discharge tube 16 and the second discharge tube 18 to be uniform. As a result, it is possible to generate laser light which has stable laser power.

Figure 6:
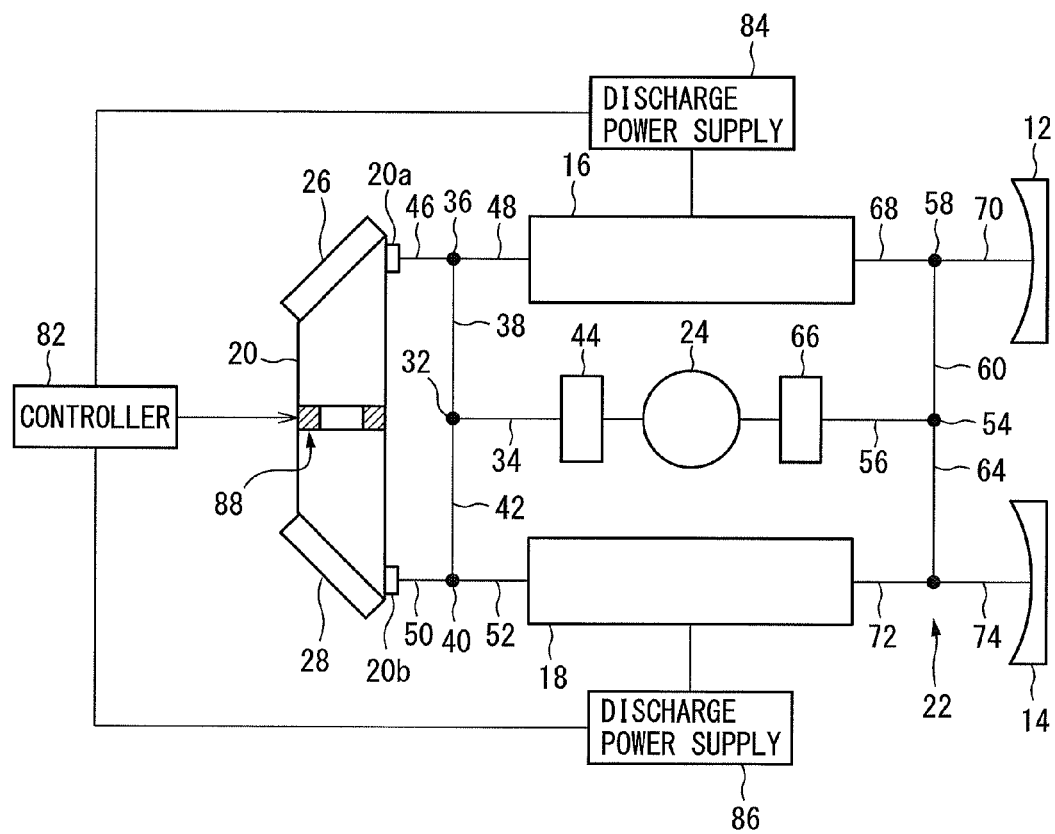
FIG. 6 is a schematic view of a laser oscillator according to another embodiment.

Next, referring to FIG. 6, a laser oscillator 80 according to another embodiment will be explained. The laser oscillator 80 includes the output mirror 12, the rear mirror 14, the first discharge tube 16, the second discharge tube 18, the light guide 20, the laser medium flow path 22, the blower 24, a controller 82, a first discharge power supply 84, a second discharge power supply 86, and a diaphragm mechanism 88.

The first discharge power supply 84 supplies power to the discharge electrode provided at the first discharge tube 16. The second discharge power supply 86 supplies power to the discharge electrode provided at the second discharge tube 18. The controller 82 sends a power command to each of the first discharge power supply 84 and the second discharge power supply 86 so as to control the power to be supplied to the first discharge tube 16 and the second discharge tube 18.

The diaphragm mechanism 88 is installed inside of the light guide 20, and shuts off a part of the inner space of the light guide 20 in an openable manner. For example, an iris diaphragm mechanism used in a camera can be applied to the diaphragm mechanism 88 of the present embodiment.

An example of such a diaphragm mechanism 88 is shown in FIG. 7A to FIG. 7C. The diaphragm mechanism 88 includes a plurality of vanes 88a arranged to be aligned in the circumferential direction of the light guide 20. These vanes 88a are operated to move inside in the radial direction with rotating in the circumferential direction.

Due to this operation of the vanes 88a, the aperture 88b defined by the inner edges of the plurality of vanes 88a is enlarged or reduced. Due to this, it is possible to change the area of an inner space of the light guide 20 through which the laser medium can pass. Note that, the diaphragm mechanism 88 is configured so that even when the aperture 88b is made the smallest, the plurality of vanes 88a will not interfere with the laser light propagating in the light guide 20.

The controller 82 controls the operation of the diaphragm mechanism 88. The diaphragm mechanism 88 operates the vanes 88a in accordance with a command from the controller 82 so as to shut off a part of the inner space of the light guide 20. Due to this, the flow rate of the laser medium flowing in the light guide 20 can be adjusted. Thus, in the present embodiment, the controller 82 and diaphragm mechanism 88 function as a flow adjustment part which adjusts the flow rate of the laser medium flowing in the light guide 20.

Figure 7:
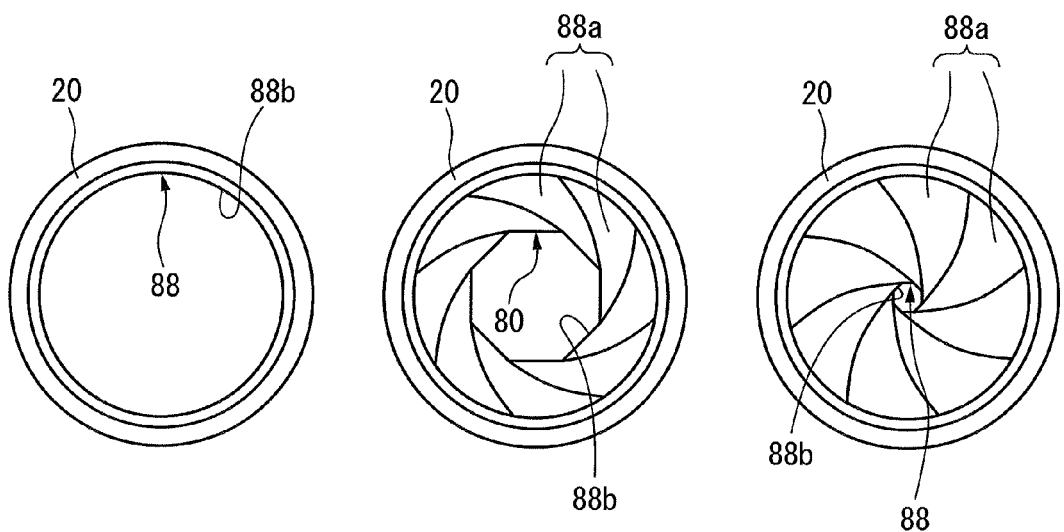
FIG. 7A is a view of an example of the diaphragm mechanism shown in FIG. 6, and shows the state where the diaphragm mechanism is wide-open.
FIG. 7B shows the state where the diaphragm mechanism is half-open.
FIG. 7C shows the state where the diaphragm mechanism is most closed.

Next, referring to FIG. 6 to FIG. 8, the function of the laser oscillator 80 according to the present embodiment will be explained. When receiving a command laser power from the user, the controller 82 sends power commands to the first discharge power supply 84 and the second discharge power supply 86 so as to controls the first discharge tube 16 and second discharge tube 18 so that the laser power of generated laser light matches the command laser power.

Further, the controller 82 operates the blower 24 so as to circulate the laser medium in the first discharge tube 16, second discharge tube 18, and light guide 20 through the laser medium flow path 22. In the present embodiment, the controller 82 controls the diaphragm mechanism 88 in response to the power commands to the first discharge power supply 84 and the second discharge power supply 86.

For example, when the controller 82 sends power commands of small power to the first discharge power supply 84 and the second discharge power supply 86, the laser power of the laser light generated in the first discharge tube 16 and the second discharge tube 18 is small.

In this case, since the laser medium inside the light guide 20 is not heated up and the amount of laser light which is absorbed in the laser medium is small, the laser power of generated laser light is stable even if the flow rate of the laser medium flowing in the light guide 20 is small.

Therefore, the controller 82 controls the diaphragm mechanism 88 so as to reduce the aperture 88b, in order to decrease the flow rate of the laser medium. Due to this, it is possible to increase the flow rate of the laser medium flowing through the first discharge tube 16 and the second discharge tube 18, whereby improve the energy conversion efficiency from discharge to laser.

On the other hand, when the controller 82 sends power commands of large power to the first discharge power supply 84 and the second discharge power supply 86, the laser power of the laser light generated in the first discharge tube 16 and the second discharge tube 18 becomes large.

In this case, since the laser medium flowing in the light guide 20 is heated up by generated laser light and the amount of laser light which is absorbed in the laser medium becomes larger as explained above, the laser power of generated laser light becomes unstable.

Therefore, the controller 82 controls the diaphragm mechanism 88 so as to enlarge the aperture 88b, in order to increase the flow rate of the laser medium in the light guide 20. Due to this, it is possible to increase the flow rate of the laser medium flowing through the light guide 20, whereby stabilize the laser power of generated laser light.

Here, the flow ratio $F_2/F_1$ of the flow rate $F_2$ of the laser medium flowing in the first discharge tube 16 and the second discharge tube 18 to the flow rate $F_1$ of the laser medium flowing in the light guide 20 is preferably controlled to be in the range of: $10 < F_2/F_1 < 15$.

This will be explained with reference to FIG. 8. As explained above, if the flow rate of the laser medium flowing in the light guide 20 is excessively decreased, the laser medium will stagnate inside of the light guide 20, whereby the heat of the laser medium cannot be removed appropriately. In this case, the stability of the laser power of generated laser light will be diminished.

On the other hand, if the flow rate of the laser medium flowing in the light guide 20 is excessively increased, the flow resistance of the laser medium flow path 22 as a whole will increase, whereby the flow rate of the laser medium flowing in the first discharge tube 16 and the second discharge tube 18 will decrease. In this case, the laser power of generated laser light will decrease.

Thus, the magnitude of the laser power of generated laser light and the stability of the laser power depend on the flow ratio of the laser medium flowing in the first discharge tube 16 and the second discharge tube 18 and the laser medium flowing in the light guide 20. Further, the magnitude of the laser power of generated laser light and the stability of the laser power are inversely proportional to each other in the relationship therebetween.

Figure 8:
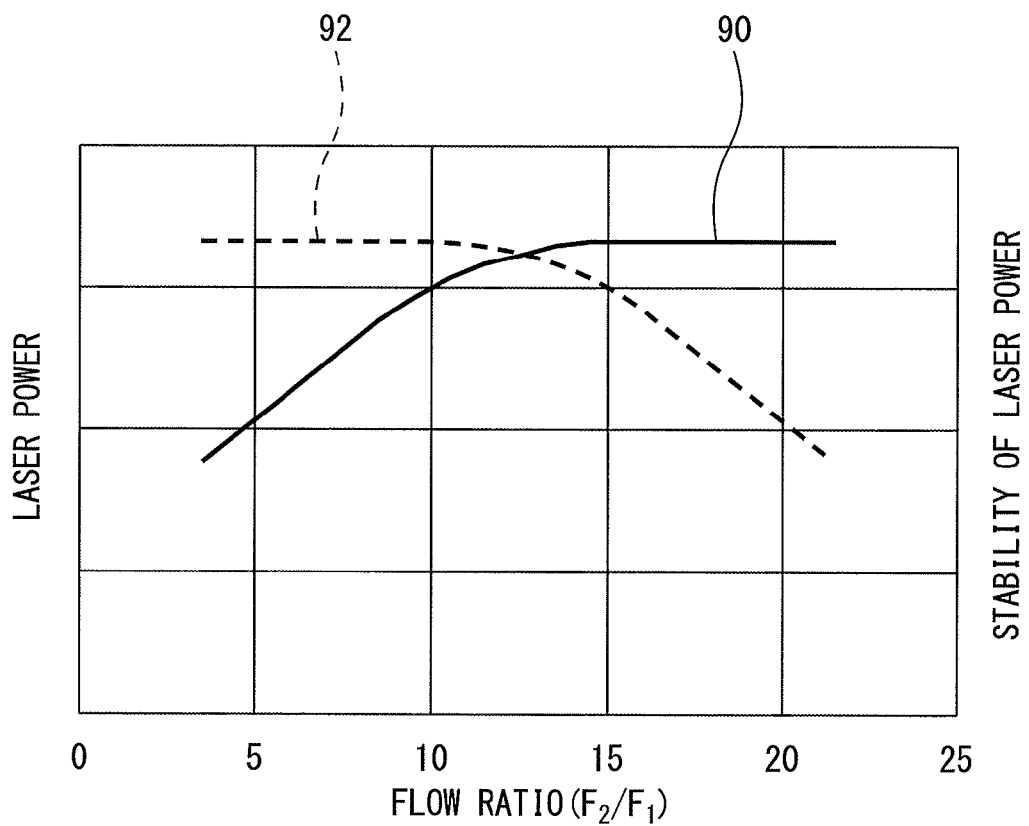
FIG. 8 is a graph showing the relationship between the flow ratio of the laser medium flowing in the discharge tube to the laser medium flowing in the light guide, the laser power of the generated laser light, and the stability of the laser power.

FIG. 8 is a graph showing the relationship between the laser power of generated laser light and the flow ratio $F_2/F_1$ of the flow rate $F_2$ of the laser medium flowing in the first discharge tube 16 and the second discharge tube 18 to the flow rate $F_1$ of the laser medium flowing in the light guide 20, and the relationship between the stability of the laser power and the flow ratio $F_2/F_1$. In FIG. 8, the solid line 90 indicates the laser power, while the broken line 92 indicates the stability of the laser power.

As shown in FIG. 8, the laser power of generated laser light gradually increases as the flow ratio $F_2/F_1$ increases, and becomes saturated when the flow ratio $F_2/F_1$ reaches a predetermined value or more. On the other hand, the laser power stability becomes saturated in the region where the flow ratio $F_2/F_1$ is small, and gradually decreases as the flow ratio $F_2/F_1$ increases over a predetermined value.

Referring to FIG. 8, it is clear that when the flow ratio $F_2/F_1$ is in the range of: $10<F_2/F_1<15$, both of the laser power and the laser power stability become high values.

Therefore, in the present embodiment, the flow ratio $F_2/F_1$ is controlled so as to be in the range of: $10<F_2/F_1<15$, on the basis of the relationship shown in FIG. 8. For example, the controller 82 controls the diaphragm mechanism 88 for adjusting the flow rate $F_1$ so as to satisfy the relationship: $10<F_2/F_1<15$. As a result, it is possible to generate high-power laser light with achieving the high stability.

Note that, in the present embodiment, a case is described where the flow ratio $F_2/F_1$ is adjusted by controlling the diaphragm mechanism 88. However, it is also possible to design the laser medium flow path 22 so as to satisfy the relationship: $10<F_2/F_1<15$, without using an element such as the diaphragm mechanism 88.

Since the flow ratio $F_2/F_1$ can be changed dependent on the flow resistances $R_A$, $R_B$, $R_C$, $R_D$, $R_E$, and $R_F$, it is possible to adjust the flow ratio $F_2/F_1$ by changing the lengths, equivalent diameters, or inner surface roughnesses of the flow paths.

Next, referring to FIG. 9, a laser oscillator 100 according to still another embodiment will be explained. The laser oscillator 100 includes the output mirror 12, the rear mirror 14, the first discharge tube 16, the second discharge tube 18, a third discharge tube 102, the first light guide 20, a second light guide 104, a laser medium flow path 106, and the blower 24.

The third discharge tube 102 is configured the same as the above-mentioned first discharge tube 16 and the second discharge tube 18. Specifically, the third discharge tube 102 is a hollow member having a first end 102a and a second end 102b opposite the first end 102a, and arranged so that the first end 102a thereof faces the rear mirror 14.

The second light guide 104 is configured the same as the above-mentioned first light guide 20, and arranged between the second end 18b of the second discharge tube 18 and the second end 102b of the third discharge tube 102. Specifically, the second light guide 104 is a hollow member having a first end 104a and a second end 104a opposite the first end 104a.

The second light guide 104 guides laser light propagating from the second discharge tube 18 toward the rear mirror 14, while guides laser light propagating from the rear mirror 14 toward the second discharge tube 18. The second light guide 104 is provided with a first folding mirror 108 and a second folding mirror 110.

Similar to the above-mentioned first folding mirror 26 and second folding mirror 28, the first folding mirror 108 and the second folding mirror 110 are arranged on the light path of laser light so as to be inclined relative to the light path by 45° in angle.

The laser medium flow path 106 according to the present embodiment differs from the above-mentioned laser medium flow path 22 in the following configuration. Specifically, the laser medium flow path 106 includes a four-way branch part 32' instead of the above-mentioned branch part 32. The above-mentioned flow paths 34, 38, and 42 are connected to the branch part 32'. Further, the laser medium flow path 106 includes a four-way branch part 54' instead of the above-mentioned branch part 54. The above-mentioned flow paths 56, 60, and 64 are connected to the branch part 54'.

The laser medium flow path 106 further includes a flow path 114 extending between the branch part 32' and a branch part 112; a flow path 116 extending between the branch part 112 and the rear mirror 14; and a flow path 118 extending between the branch part 112 and the first end 102a of the third discharge tube 102.

The branch part 112 is arranged at downstream side of the branch part 32' between the third discharge tube 102 and the rear mirror 14. The flow path 118 is in fluid communication with the inside of the third discharge tube 102 through the first end 102a of the third discharge tube 102.

The laser medium flow path 106 further includes a flow path 122 extending between the branch part 54' and a branch part 120; a flow path 124 extending between the branch part 120 and the second end 102b of the third discharge tube 102; and a flow path 126 extending between the branch part 120 and the first end 104a of the second light guide 104.

The branch part 120 is arranged at upstream side of the branch part 54' between the third discharge tube 102 and the second light guide 104. The flow path 124 is in fluid communication with the inside of the third discharge tube 102 through the second end 102b of the third discharge tube 102.

Further, the flow path 126 is in fluid communication with the inside of the second light guide 104 through the first end 104a of the second light guide 104. On the other hand, the flow path 74 extends from the branch part 62 and is connected to the second end 104b of the second light guide 104 so as to be in fluid communication with the inside of the second light guide 104.

Next, referring to FIG. 9 and FIG. 10, the flow resistances of the laser medium flow path 106 will be explained. FIG. 10 is a view corresponding to FIG. 2, and illustrates an equivalent circuit showing the flow resistances of the respective flow paths of the laser medium flow path 106. Similar as FIG. 2, the flow resistance "$R_{XX}$" shown in FIG. 10 corresponds to the flow resistance of the flow path "XX" in FIG. 9.

The intake opening 24b of the blower 24 and the first end 104a of the second light guide 104 are fluidly connected to each other via the flow paths 56, 122, and 126. Therefore, the flow resistance $R_G$ of the laser medium flow path 106 between the intake opening 24b of the blower 24 and the first end 104a of the second light guide 104 depends on the flow resistance $R_{56}$ of the flow path 56, the flow resistance $R_{122}$ of the flow path 122, and the flow resistance $R_{126}$ of the flow path 126.

On the other hand, the intake opening 24b of the blower 24 and the second end 104b of the second light guide 104 are fluidly connected to each other via the flow paths 56, 64, and 74. Therefore, the flow resistance $R_H$ of the laser medium flow path 106 between the intake opening 24b of the blower 24 and the second end 104b of the second light guide 104 depends on the flow resistance $R_{56}$ of the flow path 56, the flow resistance $R_{64}$ of the flow path 64, and the flow resistance $R_{74}$ of the flow path 74.

According to the present embodiment, the laser medium flow path 106 is configured so that the flow resistance $R_G$ is different from the flow resistance $R_H$, in order to generate a flow of the laser medium inside the second light guide 104. Specifically, the flow paths 74, 126, 64, and 122 are configured so that the flow resistance $R_{74}$ is equal to the flow resistance $R_{126}$, while the flow resistance $R_{64}$ becomes smaller than the flow resistance $R_{122}$.

According to this configuration, the laser medium pressure at the first end 104a of the second light guide 104 becomes higher than the laser medium pressure at the second end 104b.

Due to this, it is possible to generate a flow of the laser medium from the first end 104a toward the second end 104b of the second light guide 104.

In order to make the flow resistance $R_H$ to be smaller than the flow resistance $R_G$, the length of the flow path 64 may be set to be shorter than the length of the flow path 122 or the equivalent diameter of the flow path 64 may be set to be larger than the equivalent diameter of the flow path 122, for example.

On the other hand, the discharge opening 24a of the blower 24 and the first end 102a of the third discharge tube 102 are fluidly connected to each other via the flow paths 34, 114, and 118. Therefore, the flow resistance $R_I$ of the laser medium flow path 106 between the discharge opening 24a of the blower 24 and the first end 102a of the third discharge tube 102 depends on the flow resistance $R_{34}$ of the flow path 34, the flow resistance $R_{114}$ of the flow path 114, and the flow resistance $R_{118}$ of the flow path 118.

According to the present embodiment, the laser medium flow path 106 is configured so that the flow resistances $R_C$, $R_D$, and $R_I$ become the same as each other. Specifically, the lengths, the equivalent diameter, or the inner surface roughnesses of the flow paths 114 and 118 is adjusted so that the flow resistance $R_I$ is made to be the same as the flow resistances $R_C$, $R_D$.

On the other hand, the intake opening 24b of the blower 24 and the second end 102b of the third discharge tube 102 are fluidly connected to each other via the flow paths 56, 122, and 124. Therefore, the flow resistance $R_J$ of the laser medium flow path 106 between the intake opening 24b of the blower 24 and the second end 102b of the third discharge tube 102 depends on the flow resistance $R_{56}$ of the flow path 56, the flow resistance $R_{122}$ of the flow path 122, and the flow resistance $R_{124}$ of the flow path 124.

According to the present embodiment, the laser medium flow path 106 is configured so that the flow resistances $R_E$, $R_F$, and $R_J$ become the same. For example, when the flow path 122 is formed to be longer than the flow path 64, the equivalent diameter of the flow path 72 may be set to be smaller than the equivalent diameter of the flow path 124, in order to make the flow resistance $R_J$ be the same as the flow resistance $R_F$.

Thus, the laser medium flow path 106 according to the present embodiment is configured so that the flow resistances $R_C$, $R_D$, and $R_I$ become the same as each other, and so that the flow resistances $R_E$, $R_F$, and $R_J$ become the same as each other. According to this configuration, the laser medium pressures at the first end 16a of the first discharge tube 16, the first end 18a of the second discharge tube 18, and the first end 102a of the third discharge tube 102 can be made the same as each other.

Along with this, the laser medium pressures at the second end 16b of the first discharge tube 16, the second end 18b of the second discharge tube 18, and the second end 102b of the third discharge tube 102 can be made the same as each other. Due to this, it is possible to make the pressure distributions in the first discharge tube 16, the second discharge tube 18, and the third discharge tube be the same.

Next, referring to FIG. 9 and FIG. 10, the flow of the laser medium in the laser medium flow path 106 will be explained. Note that, the flow of the laser medium which circulates through the first discharge tube 16, second discharge tube 18, and first light guide 20 is similar to that of the embodiment shown in FIG. 1, so a detailed explanation will be omitted.

The laser medium flown into the flow path 114 from the branch part 32' passes through flow path 114, then reaches the branch part 112, and is divided into the flow path 116 and the flow path 118 at the branch part 112. The laser medium flown into the flow path 118 passes through the flow path 118, and flows into the third discharge tube 102 through the first end 102a.

The laser medium passing through the third discharge tube 102 flows into the flow path 124 through the second end 102b, passes through the flow path 124, and reaches the branch part 120. As explained above, in the present embodiment, a flow from the branch part 120 to the second light guide 104 is generated due to the difference between the flow resistance $R_G$ and the flow resistance $R_H$.

Accordingly, at the branch part 120, the laser medium is divided into the flow path 122 and the flow path 126. The laser medium flown into the flow path 126 flows into the second light guide 104 through the first end 104a, and passes-through the inside of the second light guide 104.

Then, the laser medium flows into the flow path 74 through the second end 104b, passes through the flow path 74, and reaches the branch part 62, whereby merges with the laser medium having flown through the flow path 72 at the branch part 62. The merged laser medium flows into the flow path 64.

On the other hand, the laser medium flown into the flow path 122 from the branch part 120 passes through the flow path 122, then reaches the branch part 54', whereby merges with the laser medium having flown through the flow paths 60 and 64 at the branch part 120.

According to the present embodiment, by setting the flow resistances $R_A$ to $R_J$ to satisfy the above-mentioned relationships, it is possible to generate a flow of laser medium inside of the first light guide 20 and the second light guide 104, while keeping the pressure distributions in the first discharge tube 16, the second discharge tube 18, and third discharge tube 102 to be the same.

Due to this, it is possible to prevent stagnation of the laser medium in the first light guide 20 and the second light guide 104 and effectively remove the heat of the laser medium, while making the discharges in the first discharge tube 16, the second discharge tube 18, and the third discharge tube 102 to be uniform. As a result, it is possible to generate laser light having stable laser power.

Figure 11:
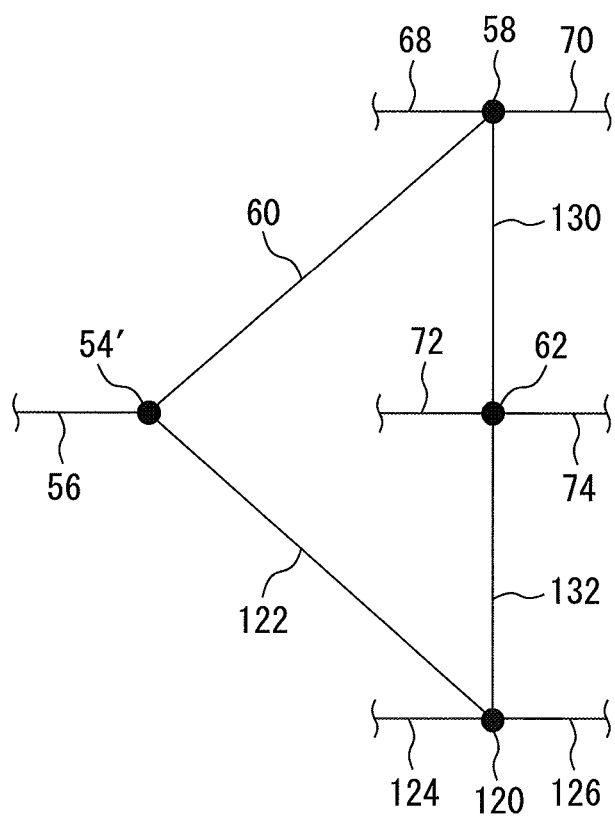
FIG. 11 shows another example of the laser medium flow path shown in FIG. 9.

Note that, various types of flow paths can be applied for making the flow resistances $R_G$ and $R_H$ to be different from each other. FIG. 11 shows a modification of the laser medium flow path 106 shown in FIG. 9. In the embodiment shown in FIG. 11, the flow path 64 shown in FIG. 9 is eliminated, and instead, the flow path 130 extending from the branch part 62 to the branch part 58 and the flow path 132 extending from the branch part 62 to the branch part 120 are provided.

In this case, when the laser medium flows from the branch part 62 to the branch part 54', the laser medium may pass from the branch part 62 through the flow path 130, branch part 58, and flow path 60 to the branch part 54', or pass from the branch part 62 through the flow path 132, branch part 120, and flow path 122 to the branch part 54'.

Therefore, the flow path 122 between the branch part 120 and the branch part 54' becomes shorter than the flow path between the branch part 62 and the branch part 54' (i.e., flow path 130+flow path 60, or flow path 132+flow path 122), so the flow resistance $R_G$ becomes smaller than the flow resistance $R_H$. In this case, the laser medium flows from the second end 104b of the second light guide 104 toward the first end 104a.

Figure 9:
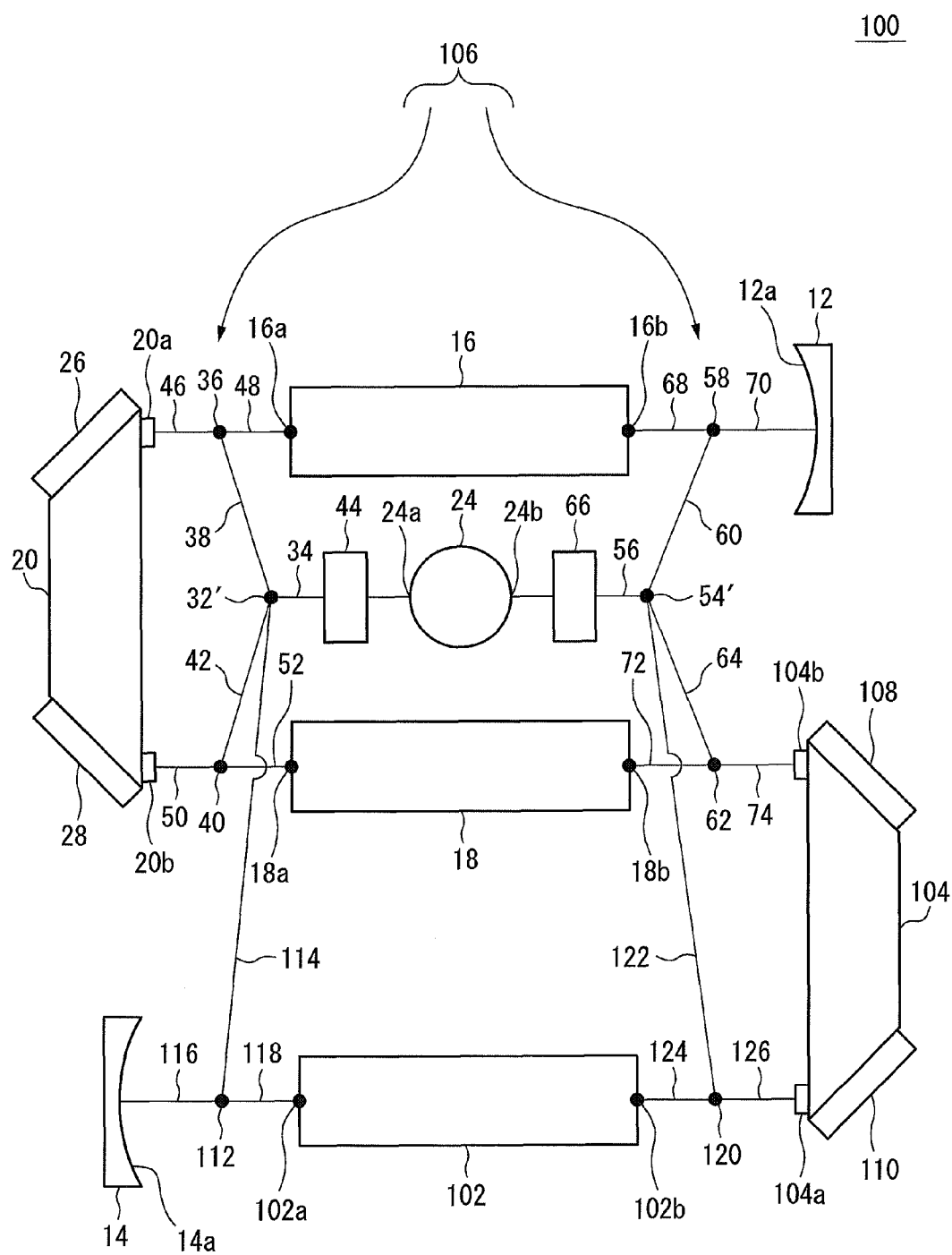
FIG. 9 is a schematic view of a laser oscillator according to still another embodiment.
Figure 10:
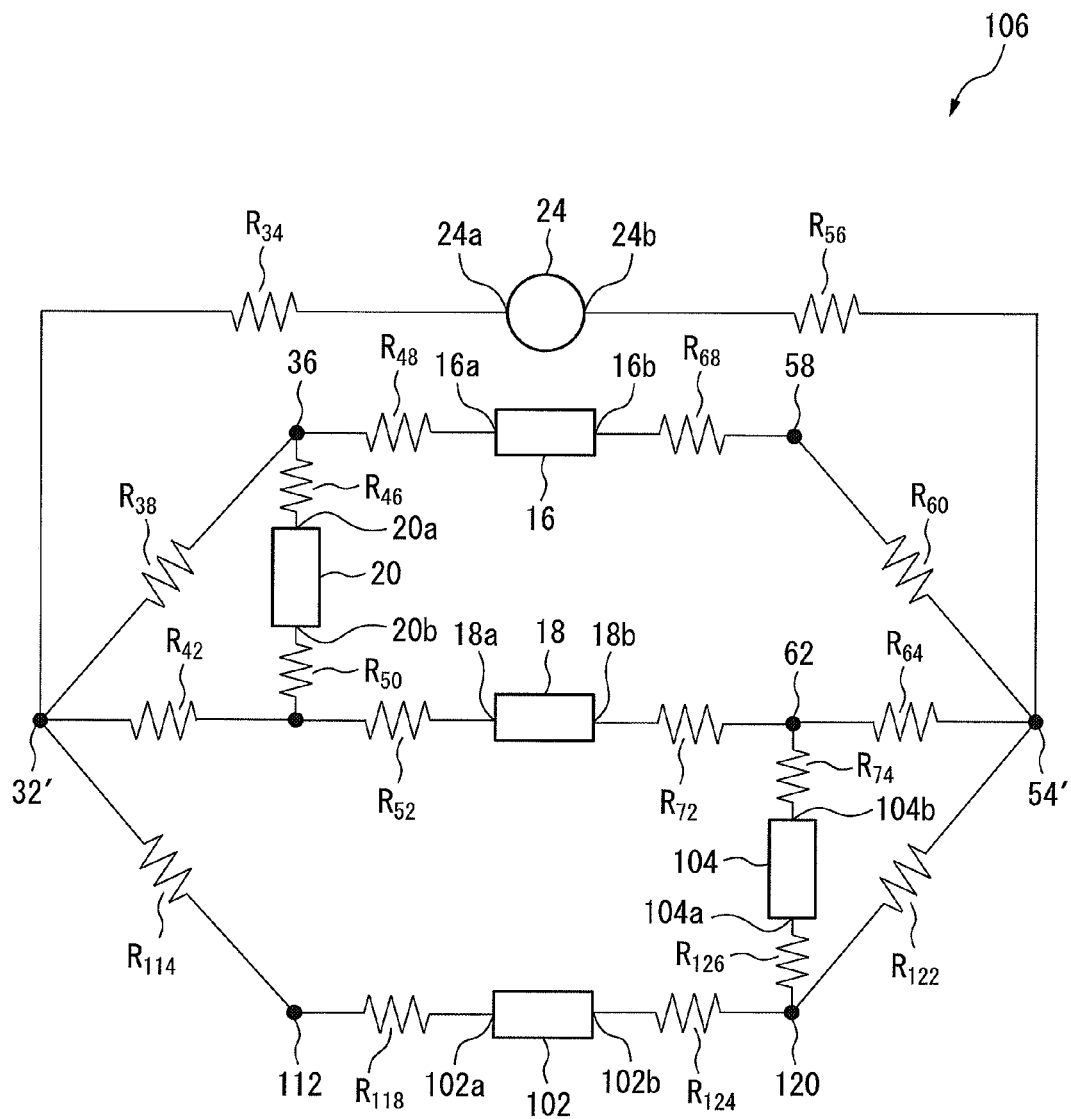
FIG. 10 shows an equivalent circuit of the laser medium flow path shown in FIG. 9.

Note that, in the embodiment shown in FIG. 9, the flow path 122 may be eliminated, and instead, a flow path extending from the branch part 120 to the branch part 62 and a flow path extending from the branch part 120 to the branch part 58 may be provided. In this case, the flow path between the branch part 120 and the branch part 54' becomes longer than the flow path 64 between the branch part 62 and the branch part 54', so the flow resistance $R_G$ becomes larger than the flow resistance $R_H$.

Figure 12:
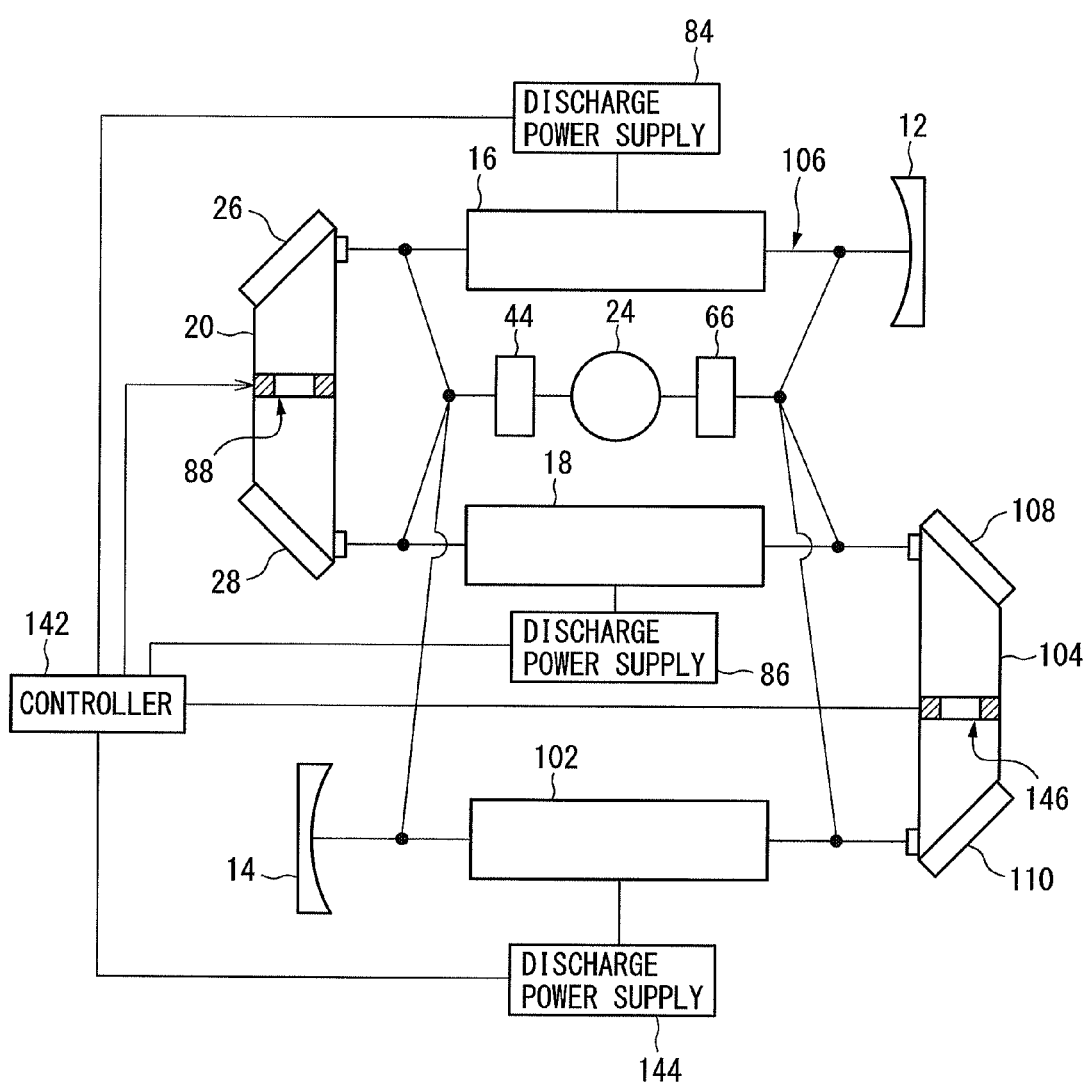
FIG. 12 is a schematic view of a laser oscillator according to still another embodiment.

Next, referring to FIG. 12, a laser oscillator 140 according to still another embodiment will be explained. Similar to the above-mentioned laser oscillator 100, the laser oscillator 140 includes the output mirror 12, the rear mirror 14, the first discharge tube 16, the second discharge tube 18, the third discharge tube 102, the first light guide 20, the second light guide 104, the laser medium flow path 106, and the blower 24.

In addition, the laser oscillator 140 further includes a controller 142, the first discharge power supply 84, the second discharge power supply 86, a third discharge power supply 144, the first diaphragm mechanism 88, and a second diaphragm mechanism 146.

The third discharge power supply 144 supplies power to a discharge electrode provided at the third discharge tube 102. The controller 142 sends a power command to each of the first discharge power supply 84, second discharge power supply 86, and third discharge power supply 144 so as to control the power to be supplied to the first discharge tube 16, second discharge tube 18, and third discharge tube 102.

The second diaphragm mechanism 146 is configured similar as the first diaphragm mechanism 88 shown in FIG. 7A to FIG. 7C, and installed inside of the second light guide 104. The second diaphragm mechanism 146 shuts off a part of the inner space of the second light guide 104 in an openable manner in accordance with a command from the controller 142.

Due to this, it is possible to adjust the flow rate of the laser medium flowing in the second light guide 104. Thus, in the present embodiment, the controller 142 and the first diaphragm mechanism 88 function as a first flow adjustment part which adjusts the flow rate of the laser medium flowing in the first light guide 20, while the controller 142 and the second diaphragm mechanism 146 function as a second flow adjustment part which adjusts the flow rate of the laser medium flowing in the second light guide 104.

Next, the function of the laser oscillator 140 according to the present embodiment will be explained. The controller 142 controls the first diaphragm mechanism 88 and the second diaphragm mechanism 146 in response to the power commands to the first discharge power supply 84, the second discharge power supply 86, and the third discharge power supply 144.

For example, when sending the power commands of small power to the first discharge power supply 84, the second discharge power supply 86, and the third discharge power supply 144, the controller 142 reduces the apertures 88b of each of the first diaphragm mechanism 88 and second diaphragm mechanism 146 in order to decrease the flow rate of the laser medium in the first light guide 20 and the second light guide 104.

Due to this, it is possible to increase the flow rate of the laser medium flowing through the first discharge tube 16, the second discharge tube 18, and the third discharge tube 102, whereby improve the energy conversion efficiency from discharge to laser.

On the other hand, when sending the power commands of large power to the first discharge power supply 84, second discharge power supply 86, and third discharge power supply 144, the controller 142 enlarges the apertures 88b of each of the first diaphragm mechanism 88 and the second diaphragm mechanism 146, in order to increase the flow rate of the laser medium in the first light guide 20 and the second light guide 104. Due to this, it is possible to increase the flow rate of the laser medium flowing through the first light guide 20 and second light guide 104, whereby stabilize the laser power of generated laser light.

Preferably, the flow ratio $F_4/F_3$ of the flow rate $F_4$ of the laser medium flowing in the first discharge tube 16, second discharge tube 18, and third discharge tube 102 to the flow rate $F_3$ of the laser medium flowing in the first light guide 20 and second light guide is controlled to be in the range of: $10<F_4/F_3<15$. By this control, it is possible to generate high-power laser light while achieving high stability, as explained with reference to FIG. 8.

Above, embodiments of the invention were used to explain the invention, but the above embodiments do not limit the inventions according to the claims. Further, combinations of the features which are explained in the embodiments of the invention may also be included in the technical scope of the invention. However, not all of the combinations of these features are necessarily essential for the solution of the invention. Further, the fact that the above embodiments can be changed or improved in various ways would be clear to a person skilled in the art.

The invention claimed is:

1. A laser oscillator comprising:
   a first discharge tube and a second discharge tube;
   a first light guide arranged between a first end of the first discharge tube and a first end of the second discharge tube;
   a laser medium flow path which is in fluid communication with each of the first discharge tube, the second discharge tube, and the first light guide; and
   a blower arranged in the laser medium flow path so as to circulate a laser medium to the laser medium flow path, the first discharge tube, and the second discharge tube, wherein
   a flow resistance of the laser medium flow path between a discharge opening of the blower and the first end of the first discharge tube is equal to a flow resistance of the laser medium flow path between the discharge opening and the first end of the second discharge tube,
   a flow resistance of the laser medium flow path between an intake opening of the blower and a second end of the first discharge tube opposite the first end of the first discharge tube is equal to a flow resistance of the laser medium flow path between the intake opening and a second end of the second discharge tube opposite the first end of the second discharge tube, and
   a flow resistance of the laser medium flow path between the discharge opening and a first end of the first light guide is different from a flow resistance of the laser medium flow path between the discharge opening and a second end of the first light guide opposite the first end of the first light guide.

2. The laser oscillator according to claim 1, wherein the length of the laser medium flow path between the discharge opening and the first end of the first light guide is shorter than the length of the laser medium flow path between the discharge opening and the second end of the first light guide.

3. The laser oscillator according to claim 1, wherein
   the laser medium flow path between the discharge opening and the first end of the first light guide includes a portion having a first equivalent diameter, and
   the laser medium flow path between the discharge opening and the second end of the first light guide includes a portion having a second equivalent diameter smaller than the first equivalent diameter.

4. The laser oscillator according to claim 1, further comprising a heat exchanger arranged at least one of downstream side of the discharge opening and upstream side of the intake opening in order to remove heat from the passing laser medium.

5. The laser oscillator according to claim 1, further comprising a first flow adjustment part which adjusts a flow rate of the laser medium flowing in the first light guide.

6. The laser oscillator according to claim 1, wherein a flow ratio of the laser medium flowing in the first discharge tube and the second discharge tube to the laser medium flowing in the first light guide is larger than 10 and smaller than 15.

7. The laser oscillator according to claim 1, further comprising:
 a third discharge tube having a first end and a second end opposite the first end thereof; and
 a second light guide arranged between the second end of the second discharge tube and the second end of the third discharge tube, wherein
 the laser medium flow path is in fluid communication with each of the second light guide and the third discharge tube,
 a flow resistance of the laser medium flow path between the discharge opening and the first end of the third discharge tube is equal to a flow resistance of the laser medium flow path between the discharge opening and the first end of the first discharge tube,
 a flow resistance of the laser medium flow path between the intake opening and the second end of the third discharge tube is equal to a flow resistance of the laser medium flow path between the intake opening and the second end of the first discharge tube, and
 a flow resistance of the laser medium flow path between the intake opening and a first end of the second light guide is different from a flow resistance of the laser medium flow path between the intake opening and a second end of the second light guide opposite the first end of the second light guide.

8. The laser oscillator according to claim 7, wherein the length of the laser medium flow path between the intake opening and the first end of the second light guide is longer than the length of the laser medium flow path between the intake opening and the second end of the second light guide.

9. The laser oscillator according to claim 7 wherein
 the laser medium flow path between the intake opening and the first end of the second light guide includes a portion having a third equivalent diameter, and
 the laser medium flow path between the intake opening and the second end of the second light guide includes a portion having a fourth equivalent diameter larger than the third equivalent diameter.

10. The laser oscillator according to claim 7, wherein a flow ratio of the laser medium flowing in the first discharge tube, the second discharge tube, and the third discharge tube to the laser medium flowing in the first light guide and the second light guide is larger than 10 and smaller than 15.

11. The laser oscillator according to claim 7, further comprising a second flow adjustment part which adjusts the flow rate of the laser medium flowing in the second light guide.

* * * * *